AMINOARALKYL SILICON COMPOUNDS AND PROCESS FOR THEIR PRODUCTION

Donald L. Bailey, Snyder, N.Y., and Ronald M. Pike, Chelmsford, Mass., assignors to Union Carbide Corporation, a corporation of New York
No Drawing. Filed June 14, 1960, Ser. No. 35,872
30 Claims. (Cl. 260—46.5)

This invention relates to new organosilicon compounds and to processes for their production. More particularly this invention is concerned with aminoaralkylhydrocarbonoxysilanes and aminoaralkylpolysiloxanes as new compositions of matter and to processes for their production.

The aminoaralkylhydrocarbonoxysilanes of this invention contain the unit reprsented by the general formula:

$$H_2N-Ar-C_aH_{2a}-Si\equiv \quad (1)$$

and can be graphically represented by the following general formula:

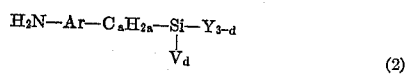

$$H_2N-Ar-C_aH_{2a}-\underset{\underset{V_d}{|}}{Si}-Y_{3-d} \quad (2)$$

wherein Ar represents an arylene radical such as a phenylene radical, and including a substituted phenylene radical; V represents an alkoxy radical containing from 1 to 4 carbon atoms inclusive, or an aryloxy radical; Y represents an alkyl group containing from 1 to 4 carbon atoms inclusive; (a) is an integer having a value of from 2 to about 8 inclusive or higher and preferably from 2 to about 4 inclusive; and (d) is an integer having a value of from 1 to 3 inclusive. Illustrative of the substituents which may be attached to the phenylene radical are alkyl radicals such as methyl, ethyl, propyl, etc., alkoxy radicals such as methoxy, ethoxy, etc., chlorine atoms, and the like.

The compounds of this invention can be produced by reduction of a nitroaralkylhydrocarbonoxysilane represented by the general formula:

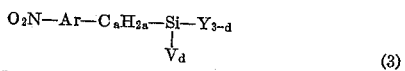

$$O_2N-Ar-C_aH_{2a}-\underset{\underset{V_d}{|}}{Si}-Y_{3-d} \quad (3)$$

wherein Ar, V, Y, (a) and (d) have the same meanings as hereinbefore indicated. Illustrative of the nitroaralkylhydrocarbonoxysilanes suitable as starting materials in this invention are beta-(nitrophenyl)-ethyltriethoxysilane, gamma-(nitrophenyl)-propyltriethoxysilane, delta-(nitrophenyl)-butylmethyldiethoxysilane, beta - (nitrophenyl)-ethyldimethylethoxysilane, and beta-(nitrotolyl)-ethyltriethoxysilane.

The aminoaralkylpolysiloxanes of this invention can be produced by the reduction of a nitroaralkylsilane followed by hydrolysis of the silane. By way of illustration, reduction and hydrolysis of trifunctional nitroaralkylhydrocarbonoxysilane produced aminoaralkylpolysiloxanes containing units represented by the general formula:

$$[H_2N-Ar-C_aH_{2a}-Si-O_{3/2}] \quad (4)$$

and reduction and hydrolysis of difunctional nitroaralkylhydrocarbonoxysilane produces aminoaralkylpolysiloxanes containing units represented by the general formula:

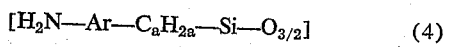

$$\left[\begin{array}{c}H_2N-Ar-C_aH_{2a}-Si-O\\ |\\ Y\end{array}\right] \quad (5)$$

while reduction and hydrolysis of monofunctional nitroaralkylhydrocarbonoxysilane produces disiloxanes represented by the general formula:

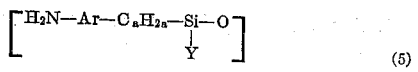

$$\left[\begin{array}{c}H_2N-Ar-C_aH_{2a}-SiO_{1/2}\\ |\\ Y_2\end{array}\right] \quad (6)$$

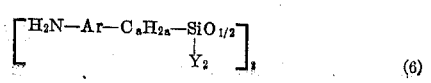

wherein Ar, Y and (a) have the same meanings as previously indicated.

The aminoaralkylpolysiloxanes of this invention can also be produced by the reduction of nitroaralkylpolysiloxanes.

The nitroaralkylhydrocarbonoxysilanes and the nitroaralkylpolysiloxanes used in producing the compounds of this invention and the processes whereby they are produced are the subject matter of our copending patent application Serial No. 655,505, filed April 29, 1957.

The reduction of the nitroaralkylhydrocarbonoxysilanes or the nitroaralkylpolysiloxanes can be carried out by dissolving the nitro compound in a substantially anhydrous organic solvent, such as ethanol, benzene, dioxane or the like which is inert to the hydrogenation reaction; adding a hydrogenation catalyst to the mixture and then reducing with hydrogen under pressure. When a functional alkoxy derivative is to be reduced, the reduction is best carried out in a substantially anhydrous and neutral mixture to prevent hydrolysis of the functional alkoxy groups.

Suitable hydrogenation catalysts are platinum oxide on carbon, palladium on carbon, Raney-nickel and the like. A catalytic amount, usually from about 0.01% to about 5% by weight of catalyst based on the weight of nitro compound charged is added. Pressure and temperature are not critical; however, the reduction is best carried out at a hydrogen pressure of at least about 20 p.s.i.g. (pounds per square inch gage pressure), and at a temperature of at least about 20° C. Higher temperatures can be used, but the temperature should preferably be below the boiling point of the solvent selected. After the reduction is completed, the reaction mixture is filtered to remove the insoluble catalyst and the produced aminoaralkylsilicon compound is recovered by conventional distillation techniques.

The aminoaralkylhydrocarbonoxysilanes produced by this invention are colorless liquids when in the pure state, and darken on standing when exposed to light or the atmosphere. They are soluble in the common organic solvents, such as ether, ethanol, benzene, toluene and dioxane; and are also soluble in aqueous dilute hydrochloric acid solution.

The following schematic diagram illustrates the reaction sequences:

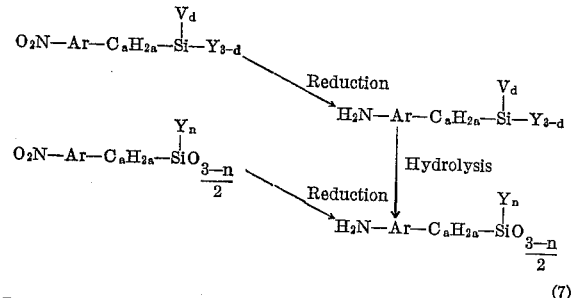

(7)

In the above Ar, V, Y, (a) and (d) have the same meanings as hereinbefore indicated, and (n) is an integer having a value of from 0 to 2.

Among the aminoaralkylsilicon compounds which can be produced by the processes of this invention are beta-(aminophenyl)-ethyltriethoxysilane, gamma-(aminophenyl)-propyltriethoxysilane, delta - (aminophenyl) - butylmethyldiethoxysilane, beta-(aminophenyl)-ethyldimethylethoxysilane, beta - (aminotolyl) - ethyltriethoxysilane, beta-(aminophenyl)-ethylpolysiloxane and beta-(aminotolyl)-propylpolysiloxane.

The aminoaralkylpolysiloxanes of this invention can be composed solely of units represented by Formulae 4, 5 and/or 6. Also included among the aminoaralkylpolysiloxanes of this invention are those copolymeric siloxanes that contain one or more units represented by Formulae 4, 5 or 6 and one or more units represented by the formula:

$$R_eSiO_{\frac{4-e}{2}} \quad (8)$$

wherein R is a monovalent hydrocarbon radical and $e$ has a value from 1 to 3 inclusive.

Illustrative of the monovalent hydrocarbon radicals represented by R in Formula 8 are the linear aliphatic radicals (e.g. the methyl, ethyl and octadecyl radicals), the cycloaliphatic radicals (e.g. the cyclohexyl and the cyclopentyl radicals), the aryl radicals (e.g. the phenyl, tolyl, xenyl and naphthyl radicals), the aralkyl radicals (e.g. the benzyl and beta-phenylethyl radicals), the unsaturated linear aliphatic radicals (e.g. the vinyl, allyl and hexenyl radicals) and the unsaturated cycloaliphatic radicals (e.g. the cyclohexenyl radical). Preferably, R in Formula 8 represents a phenyl radical or an alkyl radical containing from 1 to 4 carbon atoms.

Illustrative of the units represented by Formula 8 are the methylsiloxy, dimethylsiloxy, trimethylsiloxy, ethyl(vinyl)-siloxy, beta-phenylethylsiloxy, diphenylsiloxy, phenyl(ethyl)-methylsiloxy and diethylsiloxy groups.

The copolymeric aminoaralkylpolysiloxanes of this invention that contain one or more units represented by Formula 8 as well as one or more units represented by Formulae 4, 5 or 6 can be produced by the reduction of a suitable copolymeric nitroaralkylpolysiloxane following the procedures described above for the reduction of nitroaralkylhydrocarbonoxysilanes and nitroaralkylpolysiloxanes. Alternately, such copolymeric aminoaralkylpolysiloxanes can be produced by the cohydrolysis of suitable hydrocarbonhydrocarbonoxysilanes with the aminoaralkylhydrocarbonoxysilanes of this invention according to conventional cohydrolysis procedures. Suitable hydrocarbonhydrocarbonoxysilanes are those having the formula, $R_eSiV_{4-e}$, wherein R, V and $e$ have the above-defined meanings. Such hydrocarbonhydrocarbonoxysilanes include methyltriethoxysilane, dimethyldiethoxysilane and trimethylethoxysilane.

The silanes of this invention can be used in preparation of azo dyestuffs. For example, a red dyestuff was produced by diazotizing beta-(aminophenyl)-ethyltriethoxysilane and then coupling this diazonium salt to beta-naphthol in alkaline aqueous solution. This dyestuff was substantive to natural and synthetic fibers, including glass fibers.

The aminoaralkylpolysiloxanes of this invention can be dissolved in suitable solvents (e.g. toluene) and used as varnish compositions according to conventional procedures. These aminoaralkylpolysiloxanes can be mixed with suitable fillers (e.g. asbestos) and used as molding compositions according to conventional procedures.

The following examples further serve to illustrate this invention:

*Example 1*

Beta - (nitrophenyl) - ethyltriethoxysilane (7.3 grams) was dissolved in 60 milliliters of absolute ethanol in a pressure-proof reaction bottle. Platinum oxide on carbon (0.08 gram) as catalyst was added to the bottle and the silane was reduced at room temperature using a maximum hydrogen pressure of about 37 p.s.i.g. (pounds per square inch gage pressure). A drop in hydrogen pressure of 5 p.s.i.g. in the bottle was observed in about 15 minutes; and thereafter the pressure remained constant. The reaction mixture was filtered to remove the catalyst and then fractionally distilled under reduced pressure. After removal of the ethanol, 5.3 grams of beta-(aminophenyl)-ethyltriethoxysilane distilled over at a pressure of 0.4 to 0.5 millimeter of mercury, and at a temperature of 113° to 134° C. An analytically pure sample had a boiling point of 133° to 134° C. at a pressure of 0.5 millimeter of mercury, and a refractive index of 1.4940 at 25° C. *Microanalysis.*—Calcd. for $C_{14}H_{23}O_3NSi$: N, 4.98; Si, 9.97. Found: N, 4.7; Si, 9.1.

*Example 2*

Beta - (aminophenyl) - ethyltriethoxysilane (2 grams) and water (20 milliliters) were placed in a 100 milliliter flask equipped with a reflux condenser. An oil-in-water suspension was thereby formed which was refluxed for one-half hours. The contents of the flask was cooled to room temperature, 5 milliliters of a 28% ammonium hydroxide solution were added to the flask and the contents of the flask were refluxed for about 12 hours. Solid beta-(aminophenyl)-ethylpolysiloxane was formed and was filtered, washed on with water until the washings were neutral and then dried at 65° C. overnight in a vacuum. The yield of the siloxane was 1.1 grams. It was a light brown resin. This resin was readily diazotized in aqueous medium and produced a red dyestuff when the diazonium salt thereof was coupled to beta-naphthol.

*Example 3*

When a mixture is formed in an autoclave containing one mole of a siloxane having the formula:

$$O_2NC_6H_4CH_2CH_2\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}CH_2CH_2C_6H_4NO_2$$

300 milliliters of ethanol and 0.2 gram of platinum oxide, and the autoclave is sealed and heated to 50° C. for one hour while excess hydrogen over that required to reduce the nitro groups is charged to the autoclave, there is produced a copolymeric siloxane of this invention having the formula:

$$H_2NC_6H_4CH_2CH_2\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}CH_2CH_2C_6H_4NH_2$$

The siloxane so produced can be isolated by removing the reaction mixture from the autoclave, filtering to remove the platinum oxide and heating the filtrate in a distillation vessel at reduced pressure to remove water and ethanol and leave the siloxane as a residue. The residue is identified as having the above formula by conventional elemental and infra-red analysis and cryoscopic molecular weight determinations.

*Example 4*

When one mole of $H_2NC_6H_4CH_2CH_2Si(CH_3)_2OC_2H_5$ and one mole of $(CH_3)_3SiOC_2H_5$ are dissolved in isopropyl ether and the solution is slowly added to a stirred mixture of ice and one mole of water that contains 0.5 gram of NaOH per gram mole of the silanes, there is produced a copolymeric siloxane of this invention having the formula:

$$H_2NC_6H_4CH_2CH_2Si(CH_3)_2OSi(CH_3)_3$$

The siloxane so produced can be isolated by fraction distillation after neutralizing the NaOH. The siloxane so isolated is identified by conventional elemental and infrared analysis and cryoscopic molecular weight determinations.

This application is a continuation-in-part application of application Serial No. 655,506, filed April 29, 1957, now abandoned.

What is claimed is:

1. Aminoaralkylpolysiloxanes containing a unit represented by the formula:

$$\left[ H_2N-Ar-C_aH_{2a}-\overset{\overset{Y_n}{|}}{Si}-O_{\frac{3-n}{2}} \right]$$

wherein Ar represents a member selected from the group consisting of a phenylene radical, an alkyl substituted phenylene radical and an alkoxy substituted phenylene radical; Y is an alkyl radical containing from 1 to 4 carbon atoms inclusive; (a) is an integer having a value of from 2 to 8 inclusive; and (n) is an integer having a value of from 0 to 2 inclusive.

2. Aminoaralkylpolysiloxanes containing a unit represented by the formula:

wherein Ar represents a member selected from the group consisting of a phenylene radical, an alkyl substituted phenylene radical and an alkoxy substituted phenylene radical; Y is an alkyl radical containing from 1 to 4 carbon atoms inclusive; (a) is an integer having a value of from 2 to 8 inclusive; and (n) is an integer having a value of from 0 to 2 inclusive and a unit represented by the formula:

$$R_eSiO_{\frac{4-e}{2}}$$

wherein R is a monovalent hydrocarbon radical and $e$ has a value from 1 to 3 inclusive.

3. The aminoaralkylpolysiloxanes of claim 2 wherein R is an alkyl radical containing from 1 to 4 carbon atoms inclusive.

4. The aminoaralkylpolysiloxanes of claim 2 wherein R is a methyl group.

5. Aminoaralkylpolysiloxanes containing a unit represented by the formula:

[H$_2$N—Ar—C$_a$H$_{2a}$—Si—O$_{3/2}$]

wherein Ar and (a) have the same meanings as claimed in claim 1.

6. Aminoaralkylpolysiloxanes containing a unit represented by the formula:

[H$_2$N—Ar—C$_a$H$_{2a}$—Si—O$_{3/2}$]

wherein Ar and (a) have the same meanings as claimed in claim 1 and a unit repsented by the formula:

$$R_eSiO_{\frac{4-e}{2}}$$

wherein R is a monovalent hydrocarbon radical and $e$ has a value from 1 to 3 inclusive.

7. The aminoaralkylpolysiloxanes of claim 6 wherein R is an alkyl radical containing from 1 to 4 carbon atoms inclusive.

8. The aminoaralkylpolysiloxanes of claim 6 wherein R is a methyl group.

9. Aminoaralkylpolysiloxanes containing a unit represented by the formula:

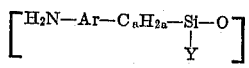

wherein Ar, Y and (a) have the same meanings as claimed in claim 1.

10. Aminoaralkylpolysiloxanes containing a unit represented by the formula:

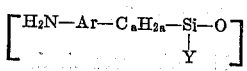

wherein Ar, Y and (a) have the same meanings as claimed in claim 1 and a unit represented by the formula:

$$R_eSiO_{\frac{4-e}{2}}$$

wherein R is a monovalent hydrocarbon radical and $e$ has a value from 1 to 3 inclusive.

11. The aminoaralkylpolysiloxanes of claim 10 wherein R is an alkyl radical containing from 1 to 4 carbon atoms inclusive.

12. The aminoaralkylpolysiloxanes of claim 10 wherein R is a methyl group.

13. Aminoaralkylpolysiloxanes containing a unit represented by the formula:

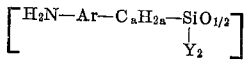

wherein Ar, Y and $a$ have the same meanings in claim 1.

14. Aminoaralkylpolysiloxanes containing a unit represented by the formula:

wherein Ar, Y and $a$ have the same meanings in claim 1 and a unit represented by the formula:

$$R_eSiO_{\frac{4-e}{2}}$$

wherein R is a monovalent hydrocarbon radical and e has a value from 1 to 3 inclusive.

15. The aminoaralkylpolysiloxanes of claim 14 wherein R is an alkyl radical containing from 1 to 4 carbon atoms. inclusive.

16. The aminoaralkylpolysiloxanes of claim 14 wherein R is a methyl group.

17. Aminoaralkyldisiloxanes represented by the formula:

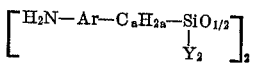

wherein Ar, Y and (a) have the same meanings as claimed in claim 1.

18. Beta-(aminophenyl)-ethylpolysiloxane.
19. Beta-(aminophenyl)-ethyltriethoxysilane.
20. The method of producing aminoaralkylsilicon compounds selected from the group consisting of aminoaralkylhydrocarbonoxysilanes represented by the formula:

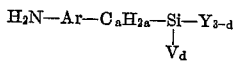

wherein Ar represents a member selected from the group consisting of a phenylene radical, an alkyl substituted phenylene radical and an alkoxy substituted phenylene radical; V represents a member selected from the group consisting of alkoxy radicals containing from 1 to 4 carbon atoms and aryloxy radicals; Y is an alkyl radical containing from 1 to 4 carbon atoms inclusive; (a) is an integer having a value of from 2 to 8 inclusive; and (d) is an integer having a value of from 1 to 3 inclusive and aminoaralkylpolysiloxanes containing the unit represented by the formula:

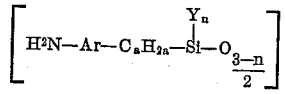

wherein Ar, Y, and (a) have the same meanings as hereinabove claimed; and (n) is an integer having a value of from 0 to 2 inclusive; which comprises reducing an anhydrous solution of the corresponding nitroaralkylsilicon compound selected from the group consisting of nitroaralkylhydrocarbonoxysilanes represented by the formula:

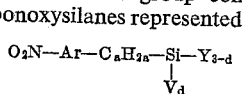

and nitroaralkylpolysiloxanes containing the unit represented by the formula:

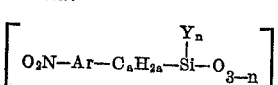

with hydrogen at a hydrogen pressure of a least about 20 pounds per square inch gage pressure and a temperature of at least about 20° C. in the presence of a catalytic amount of a hydrogenation catalyst sufficient to effect hydrogenation, 21. The method of producing aminoaralkylhydrocarbonoxysilanes represented by the formula:

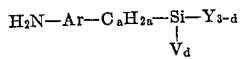

wherein Ar represents a member selected from the group consisting of a phenylene radical, an alkyl substituted phenylene radical and an alkoxy substituted phenylene radical; V represents a member selected from the group consisting of alkoxy radicals containing from 1 to about 4 carbon atoms and aryloxy radicals; Y is an alkyl radical containing from 1 to about 4 carbon atoms; $(a)$ in an integer having a value of from 2 to 8 inclusive; and $(d)$ is an integer having a value of from 1 to 3 inclusive which comprises reducing a nitroaralkyhydrocarbonoxysilane having the formula:

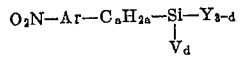

wherein Ar, V, Y, $(a)$ and $(d)$ have the same meanings as hereinbefore indicated, with hydrogen at a hydrogen pressure of at least about 20 pounds per square inch gage pressure in the presence of a catalytic amount of a hydrogenation catalyst and at a temperature of at least about 20° C.

22. The method of producing aminoaralkylhydrocarbonoxysilanes as claimed in claim 21 which comprises conducting the reduction in the presence of an inert and substantially anhydrous organic solvent.

23. The method of producing aminoaralkylhydrocarbonoxysilanes as claimed in claim 21, which comprises conducting the reduction in ethanol at about 15° C. to about 35° C. in the presence of platinum oxide on carbon as catalyst.

24. The method of producing aminoaralkylhydrocarbonoxysilanes represented by the formula:

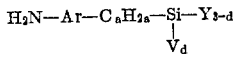

wherein Ar represents a member selected from the group consisting of a phenylene radical, an alkyl substituted phenylene radical and an alkoxy substituted phenylene radical; V represents a member selected from the group consisting of alkoxy radicals containing from 1 to about 4 carbon atoms and aryloxy radicals; Y is an alkyl radical containing from 1 to about 4 carbon atoms inclusive; $(a)$ is an integer having a value of from 2 to 8 inclusive and $(d)$ is an integer having a value of from 1 to 3 inclusive; which comprises reducing a nitroaralkylhydrocarbonoxysilane represented by the formula:

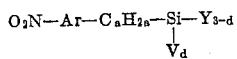

wherein Ar, V, Y, $(a)$ and $(d)$ have the same meanings as hereinbefore indicated, with hydrogen at a hydrogen pressure of at least about 20 pounds per square inch gage pressure in the presence of a catalytic amount of a hydrogenation catalyst selected from the group consisting of platinum oxide on carbon, palladium on carbon and Raney-nickel, and in the presence of an inert and substantially anhydrous organic solvent at a temperature of from about 20° C. up to about the boiling point of the solvent.

25. The method of producing beta-(aninophenyl)-ethyltriethoxysilane, which comprises dissolving beta-(nitrophenyl)-ethyltriethoxysilane in ethanol, and reducing under a hydrogen pressure of about 35 pounds per square inch gage pressure in the presence of platinum oxide on carbon catalyst at about 25° C.

26. The method of producing aminoaralkylpolysiloxanes containing the unit represented by the formula:

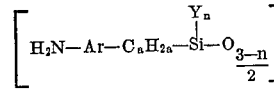

wherein Ar represents a member selected from the group consisting of a phenylene radical, an alkyl substituted phenylene radical and an alkoxy substituted phenylene radical; Y is an alkyl radical containing from 1 to 4 carbon atoms inclusive, $(a)$ is an integer having a value of from 2 to 8 inclusive, and $(n)$ is an integer having a value of from 0 to 2 inclusive which comprises producing aminoaralkylhydrocarbonoxysilanes as represented by the formula:

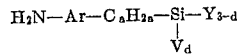

as claimed in claim 21, and wherein Ar, V, Y, $(a)$ and $(d)$ have the same meanings as claimed in claim 21, and further comprising hydrolyzing said aminoaralkylhydrocarbonoxysilanes to produce said aminoaralkylpolysiloxanes.

27. The method of producing aminoaralkylpolysiloxanes, which comprises reducing a nitroaralkylpolysiloxane containing units represented by the formula:

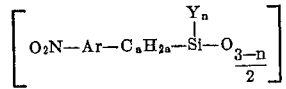

wherein Ar, Y, $(a)$ and $(n)$ have the same meanings as claimed in claim 26 with hydrogen in the presence of a catalytic amount of a hydrogenation catalyst at a hydrogen pressure of at least about 20 pounds per square inch gage pressure and at a temperature of at least about 20° C.

28. A homopolymeric aminoaralkylpolysiloxane having units represented by the formula:

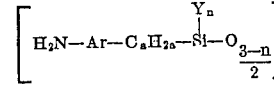

wherein Ar, Y, $(a)$ and $(n)$ have the same meanings as claimed in claim 1.

29. A homopolymeric aminoaralkylpolysiloxane containing units represented by the formula:

wherein Ar and $(a)$ have the same meanings as claimed in claim 1.

30. A homopolymeric aminoaralkylpolysiloxane having units represented by the formula:

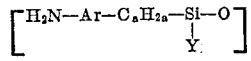

wherein Ar, Y and $(a)$ have the same meanings as claimed in claim 1.

No references cited.